Oct. 16, 1962  N. F. LOCKHART  3,059,122
MAGNETIC TRIGGER
Filed Dec. 15, 1959

INVENTOR
NEWTON F. LOCKHART
BY
ATTORNEY

United States Patent Office 3,059,122
Patented Oct. 16, 1962

3,059,122
MAGNETIC TRIGGER
Newton F. Lockhart, Wappingers Falls, N.Y., assignor to International Business Machines Corporation, New York, N.Y., a corporation of New York
Filed Dec. 15, 1959, Ser. No. 859,715
5 Claims. (Cl. 307—88)

This invention relates to trigger circuits and more particularly to a binary trigger circuit employing a single bistable magnetic core.

In the computer art, there is a need for a simple yet reliable trigger circuits of reduced size, and complexity. Although binary type circuits employing bistable magnetic cores have been shown, such circuits employ a plurality of cores and a multiplicity of windings on each such core with linking circuitry.

A binary trigger circuit in accordance with this invention comprises a single magnetic core made of material exhibiting a substantially rectangular hysteresis loop and having an aperture located in the main flux path of the core and threaded by an input winding coupling the portions of the core adjacent the aperture in opposite relationship. In addition, an output and a control winding are threaded through the main aperture of the core, the latter being serially connected with a capacitor in closed circuit relationship. The input winding, when energized by given polarity signals, causes flux reversal in one of the coupled portions and a change of a flux in the remainder of the core to induce current flow along the control winding which charges the capacitor. As the rate of flux change decreases within the core, the capacitor discharges to complete switching of flux within the core. Thus an input pulse switches the core from a first to a second state of residual flux density. Energization of the input winding by another pulse of the same polarity provides the same action and thus switches the core from the second to the first state of residual flux density. Because of the very fast action of the capacitor in conjunction with the input pulse, the output pulse observed on the output winding is uniform, being either positive or negative, depending upon the state to which the core is switched.

Accordingly, a prime object of this invention is to provide a novel binary trigger circuit.

A further object of this invention is to provide a novel trigger circuit employing only one bistable magnetic core.

Still a further object of this invention is to provide a binary trigger comprising a single bistable magnetic core and three windings coupled therto.

Yet another object of this invention is to provide a novel binary trigger circuit which is economical and easy to construct.

The foregoing and other objects, features and advantages of the invention will be apparent from the following more particular description of a preferred embodiment of the invention, as illustrated in the accompanying drawings.

Figure 1:
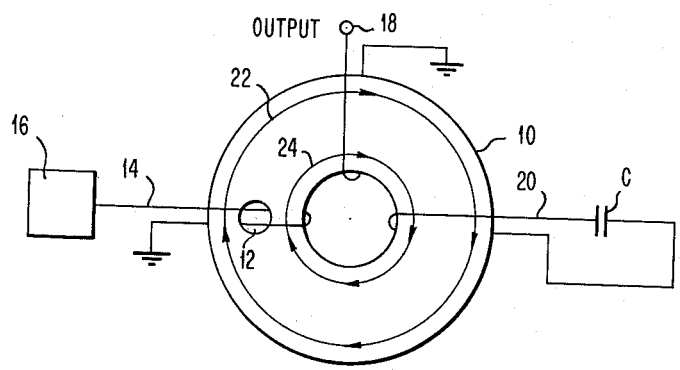
FIG. 1 illustrates an embodiment of this invention.

Referring to the FIG. 1, a magnetic core 10 is shown made of material exhibiting substantially rectangular hysteresis characteristics. Such type materials are well known in the art and distinguished over other type materials in that the material is capable of attaining different stable directions or states of remanent magnetization. The core 10 is provided with an aperture 12 centrally located in the main flux path of the core 10 and dividing the core 10 into two parallel flux paths. Coupling the core 10 and threaded through the aperture 12 is an input winding 14 connected to an input source 16 adapted to energize the winding 14 with positive pulses. The winding 14 couples the outer flux path of the core 10 in one sense and the inner flux path of the core on opposite sense. Also, an output winding 18 is wound about the entire cross-sectional area of the core 10 while a control winding 20, similarly coupling the entire cross-sectional area of the core 10, is provided with a capacitor C serially connected therewith.

Figure 2A:
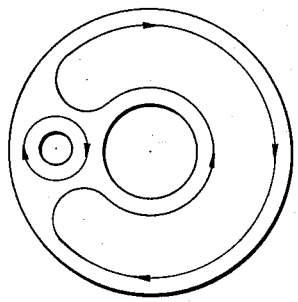
FIGS. 2a and 2b illustrate the orientation of flux within the circuit of FIG. 1 upon receipt of a first input pulse.

To describe the operation of the circuit of FIG. 1, it will be assumed that all the flux within the core 10 is directed in a clockwise direction as indicated by flux lines 22 and 24. Assuming the source 16 energizes the input winding 14 with a positive impulse, the field applied to the outer path adjacent the aperture 12 tends to saturate that portion of the core in the same direction as shown by the flux linkage 22 while the flux within the inner path is forced to assume an opposite state of saturation. The core 10 experiencing the field provided by energization of the winding 14 has its flux pattern changed as is shown in the FIG. 2a, depicting a circular flux pattern about the aperture 12 and a kidneyed flux pattern in the remainder of the core. In both instances, the direction of flux of the inner path is reversed, in that the flux direction in the inner path is counterclockwise while that of the outer path is clockwise. As this flux change takes place, a voltage is induced on the control winding 20 which charges the capacitor C such that the right hand side of the capacitor C is positively charged and the left hand side of capacitor C is negatively charged. As the flux change within the core 10 decreases with respect to time $(d\phi/dt)$, the capacitor C discharges to provide a clockwise current in the loop and thereby energize the control winding 20 which causes a field to be applied to the cross-sectional area of the core 10 so as to reverse the direction of magnetization in the outer leg and thus the direction of flux within the core 10 as is shown in the FIG. 2b. Thus with a single input pulse to the input winding 14 the total magnetization of the core 10 is reversed. Complete reversal of the magnetization of the core takes place continuously to provide a continuous output pulse on the winding 18.

Figure 2B:
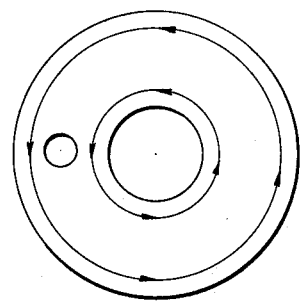
Figure 3A:
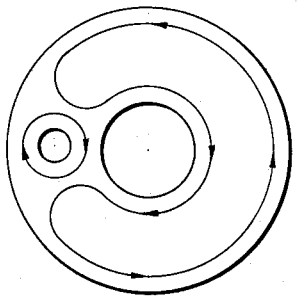
FIGS. 3a and 3b illustrate the orientation of flux within the circuit of FIG. 1 upon receipt of a second input pulse.
Figure 3B:
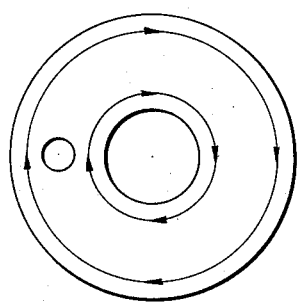

Assuming the direction of flux is as shown in the FIG. 2b for the core 10, and the source 16 again energizes the input winding 14 with a positive impulse, a field is applied to the different portions of the core 10 adjacent the aperture 12 which causes saturation of the direction of flux in the inner flux path and reverses the direction of flux in the outer flux path adjacent the aperture 12. The configuration of flux within the core 10 is as shown in the FIG. 3a depicting a clockwise flux pattern about the aperture 12, similar to that shown in the FIG. 2a, and a kidney shaped flux pattern in the remaining portion of the core with the inner direction of flux being reversed and assuming a clockwise direction and the outer path defining a counter-clockwise direction. As the direction of flux change takes place, a voltage is induced on the control winding 20 which charges the capacitor C such that the right hand side is negatively charged and the left hand side is positively charged. Again, as the rate of flux change within the core 10 decreases $(d\phi/at)$, the capacitor C discharges to provide a counter-clockwise loop current which energizes the winding 20 to provide a field to the core 10 which causes the direction of flux within the outer flux path to reverse and assume a clockwise direction. The flux pattern within the core 10 then takes the form as is shown in the FIG. 3b wherein the flux lines 22 and 24 describe a clockwise direction as is shown in the FIG. 1.

Thus, a single input of a given polarity switches the core 10 from a first datum direction of magnetization to another and a further input of the same polarity resets the magnetization of the core to the datum direction or state. What has been described therefore is a single core binary trigger and it should be realized that while the circuit operation described above was considered upon receipt of different pulses of positive polarity only, from the source 16, pulses of negative polarity only will work equally well.

While the invention has been particularly shown and described with reference to a preferred embodiment thereof, it will be understood by those skilled in the art that various changes in form and details may be made therein without departing from the spirit and scope of the invention.

What is claimed is:

1. A trigger circuit comprising a magnetic core made of material exhibiting a substantially rectangular hysteresis loop, input, output and control windings coupling said core, a capacitor serially connected with said control winding, and means for energizing said input winding to vary flux orientation in said core from a first remanent state of flux orientation to charge said capacitor, said capacitor thereafter discharging along said control winding to complete flux reversal in said core to a second remanent state of flux orientation.

2. A trigger circuit comprising a magnetic core defining a main flux path made of material exhibiting a substantially rectangular hysteresis loop and having an aperture located in the material thereof defining said main flux path, an input winding threaded through said aperture to couple portions of said core adjacent said aperture in opposing relationship, an output winding and a control winding coupling said main flux path, and a capacitor serially connected with said control winding in a bidirectional current conductive circuit loop.

3. A trigger comprising a magnetic circuit made of material capable of attaining different stable directions of flux remanence, said material having an aperture defining a first and second flux path in said circuit, input, output and control windings coupling said circuit, said input winding threaded through said aperture to cause flux reversal in one of said paths when energized, and a capacitor serially connected to said control winding in a bidirectional current conductive loop and responsive to flux reversal in said one path to energize said control winding to effect flux reversal in the other of said paths.

4. A trigger circuit comprising a toroidal magnetic core made of material exhibiting a substantially rectangular hysteresis loop adapted to be energized by unidirectional pulses, said core having an aperture in the material thereof to define a first and a second flux path, an input winding threaded through said aperture and coupling said first flux path in one sense and said second flux path in an opposite sense, an output winding and a control winding coupling said core, said input winding when energized by one of said pulses causing a reversal of the magnetization of one of said flux paths, and a capacitor serially connected to said control winding in a bidirectional current conductive loop responsive to the change in magnetization of said first flux path to thereafter cause reversal of the magnetization of said second flux path.

5. A trigger circuit comprising a multipath magnetic core formed of material exhibiting substantially rectangular hysteresis characteristics and defining a first and a second flux path, input means coupled to said core in opposite phase relationship to said first and said second flux paths, said input means being operative to switch said core from a first stable state to a second stable state and from a third stable state to a fourth stable state, means coupled to said core and responsive to a switching of said core to said second stable state to switch said core to said third stable state, said last-mentioned means being further responsive to a switching of said core to said fourth stable state to switch said core to said first stable state, and output means coupled to said core.

References Cited in the file of this patent

UNITED STATES PATENTS

| | | |
|---|---|---|
| 2,713,675 | Schmitt | July 19, 1955 |
| 2,749,451 | Talambiras | June 5, 1956 |
| 2,803,812 | Rajchman | Aug. 20, 1957 |
| 2,832,062 | Tracy | Apr. 22, 1958 |
| 2,847,659 | Kaiser | Apr. 12, 1958 |
| 2,869,112 | Hunter | Jan. 13, 1959 |

OTHER REFERENCES

Rajchman & Lo: "The Transfluxor," IRE, March 1956, pp. 321–332.

UNITED STATES PATENT OFFICE
CERTIFICATE OF CORRECTION

Patent No. 3,059,122                                October 16, 1962

Newton F. Lockhart

It is hereby certified that error appears in the above numbered patent requiring correction and that the said Letters Patent should read as corrected below.

Column 1, line 29, strike out "a", second occurrence; line 50, for "therto" read -- thereto --; column 2, line 5, for "on" read -- in --; line 62, for "(dφ/at)" read -- (dφ/dt) --.

Signed and sealed this 3rd day of September 1963.

(SEAL)
Attest:

ERNEST W. SWIDER
Attesting Officer

DAVID L. LADD
Commissioner of Patents